United States Patent [19]

Shibata

[11] Patent Number: 5,421,918
[45] Date of Patent: Jun. 6, 1995

[54] SILVER- OR SILVER-COPPER ALLOY-METAL OXIDE COMPOSITE MATERIAL

[75] Inventor: Akira Shibata, Yokohama, Japan

[73] Assignee: Sumitomo Metal Mining Co., Ltd., Tokyo, Japan; a part interest

[21] Appl. No.: 240,890

[22] Filed: May 11, 1994

Related U.S. Application Data

[60] Continuation of Ser. No. 36,891, Mar. 25, 1993, Pat. No. 5,358,585, which is a division of Ser. No. 722,296, Jun. 27, 1991, Pat. No. 5,236,523.

[30] Foreign Application Priority Data

Jun. 28, 1990 [JP] Japan ................... 2-168371

[51] Int. Cl.$^6$ ............................ C22C 5/06; C22C 5/08
[52] U.S. Cl. .................................................. 148/431
[58] Field of Search ................ 148/431, 514; 420/501, 420/502, 504, 506

[56] References Cited

U.S. PATENT DOCUMENTS 3,135,601  6/1964  Peiffer .............................. 148/431

Primary Examiner—Deborah Yee
Attorney, Agent, or Firm—Oblon, Spivak, McClelland, Maier & Neustadt

[57] ABSTRACT

A silver-metal oxide composite material comprising a silver matrix or silver-copper alloy matrix containing 50% by weight or less of copper, (a) from 0.5 to 25% by weight, in terms of elemental metal, of an oxide of at least one element selected from the group consisting of Mg, Al, Zr, Ca, Ce, Be, Th, Sr, Ti, Cr, Hf and Si, and, optionally, (b) from 0.01 to 5% by weight, in terms of elemental metal, of an oxide of at least one element selected from the group consisting of Bi, Pb, Cd, Zn, Sn, Sb, Mn and iron family metals; the oxide of the (a) element and, where present, the oxide of the (b) element being dispersed in the form of fine particles with a particle size of not more than about 0.1 μm uniformly throughout the matrix from the surface to the core thereof; and process of producing the composite material using oxidation under the conditions in which a liquid phase and a solid phase coexist.

6 Claims, 1 Drawing Sheet

SILVER- OR SILVER-COPPER ALLOY-METAL OXIDE COMPOSITE MATERIAL

This is a continuation of application Ser. No. 08/036,891, filed on Mar. 25, 1993, now U.S. Pat. No. 5,358,585, which is a divisional of Ser. No. 07/722,296 filed on Jun. 27, 1991, now U.S. Pat. No. 5,236,523.

BACKGROUND OF THE INVENTION

1. Field of the invention

The present invention relates to a novel silver- or silver-copper alloy-metal oxide composite material particularly suited to an electrode material for electric welding having a high durability against a loaded current with a large capacity, and a process of producing the same.

2. Description of Prior Art

Electric welding is widely used for assembly of various metallic plates for automobiles and electrical machinery and apparatus. The electric welding requires highly refractory electrodes, for which hard copper alloys such as Cr—Cu alloy are generally used. In particular, when a loaded current with a large capacity is applied as welding current, dispersion-strengthened materials, i.e., sintered materials produced by sintering a ceramic powder such as metal oxides or carbides together with copper, is used However, the above dispersion-strengthened materials exhibit insufficient welding resistance and wear resistance when subjected continuously to uses in which a welding current exceeding 10,000 A is applied, so that the life of the electrodes are quite short. Such a short electrode life will directly raise the production cost and lower efficiency of welding operations due to the necessity of frequent exchange of electrodes, which causes indirectly increase in production cost. Therefore, development of a material for electrodes with a long life is expected.

SUMMARY OF THE INVENTION

The present invention has been made, in view of the above, and it is an object of the present invention to provide a material capable of producing an electrode having good welding resistance and wear resistance and further having a long life, and a process of producing the material.

To attain the object above, according to the first aspect of the present invention, there is provided a silver-metal oxide composite material comprising a silver matrix, (a) from 0.5 to 25% by weight, in terms of elemental metal, of an oxide of at least one element selected from the group consisting of Mg, Al, Zr, Ca, Ce, Be, Th, Sr, Ti, Cr, Hf and Si, and, optionally, (b) from 0.01 to 5% by weight, in terms of elemental metal, of an oxide of at least one element selected from the group consisting of Bi, Pb, Cd, Zn, Sn, Sb, Mn and iron family metals such as Fe, Ni and Co; the oxide of the (a) element and, where present, the oxide of the (b) element being dispersed in the form of fine particles with a particle size of not more than about 0.1 μm uniformly throughout the matrix from the surface to the core thereof.

According to the second aspect of the present invention, there is provided a silver-copper alloy-metal oxide composite material having the same constitution as the silver-metal oxide composite material of the first aspect, except that the silver matrix is replaced by a matrix consisting of a silver-copper alloy containing 50% by weight or less of copper.

The composite material according to the first aspect can be produced, for example, by a process comprising the steps of:

(A) raising the partial pressure of oxygen and heating therein a mixture comprising silver, (a) from 0.5 to 25% by weight, in terms of elemental metal, of at least one element selected from the group consisting of Mg, Al, Zr, Ca, Ce, Be, Th, Sr, Ti, Cr, Hf and Si in a metallic and/or oxide state and, optionally, (b) from 0.01 to 5% by weight, in terms of elemental metal, of at least one element selected from the group consisting of Bi, Pb, Cd, Zn, Sn, Sb, Mn and iron family metals such as Fe, Ni and Co in a metallic and/or oxide state to thereby bring the mixture into a state where a solid phase and a liquid phase coexist, whereby all of the (a) element in a metallic state and, where present, the (b) element in a metallic state are precipitated as oxides, and (B) lowering the partial pressure of oxygen and cooling the mixture thus treated.

The composite material according to the second aspect can be produced by the same process for producing the composite material of the first aspect described above, except that the silver used in step (A) is replaced by silver and copper, the amount by weight of the copper being equivalent to that of the silver or less, and that step (B) is optionally followed by step (C) in which the mixture treated in step (B) is heated under vacuum or in a reductive or neutral atmosphere, whereby deoxidation of copper oxides formed in step (A) being carried out.

The composite material of the present invention, when used as an electrode material for electric welding, exhibits a small amount of arc erosion and causes little welding with a matter to be welded, has a long life as compared with the conventional electrode materials, and produces welded joints stable in quality, and further can contribute to improvement in productivity in welding operations. In particular, use of the composite material of the present invention markedly reduces surface roughening of the electrodes and variation of contact resistance; hence the surface of the electrode is not required to be ground, resulting that welding line can be operated for a long period time.

DETAILED DESCRIPTION OF PREFERRED EMBODIMENTS

Figure 1:
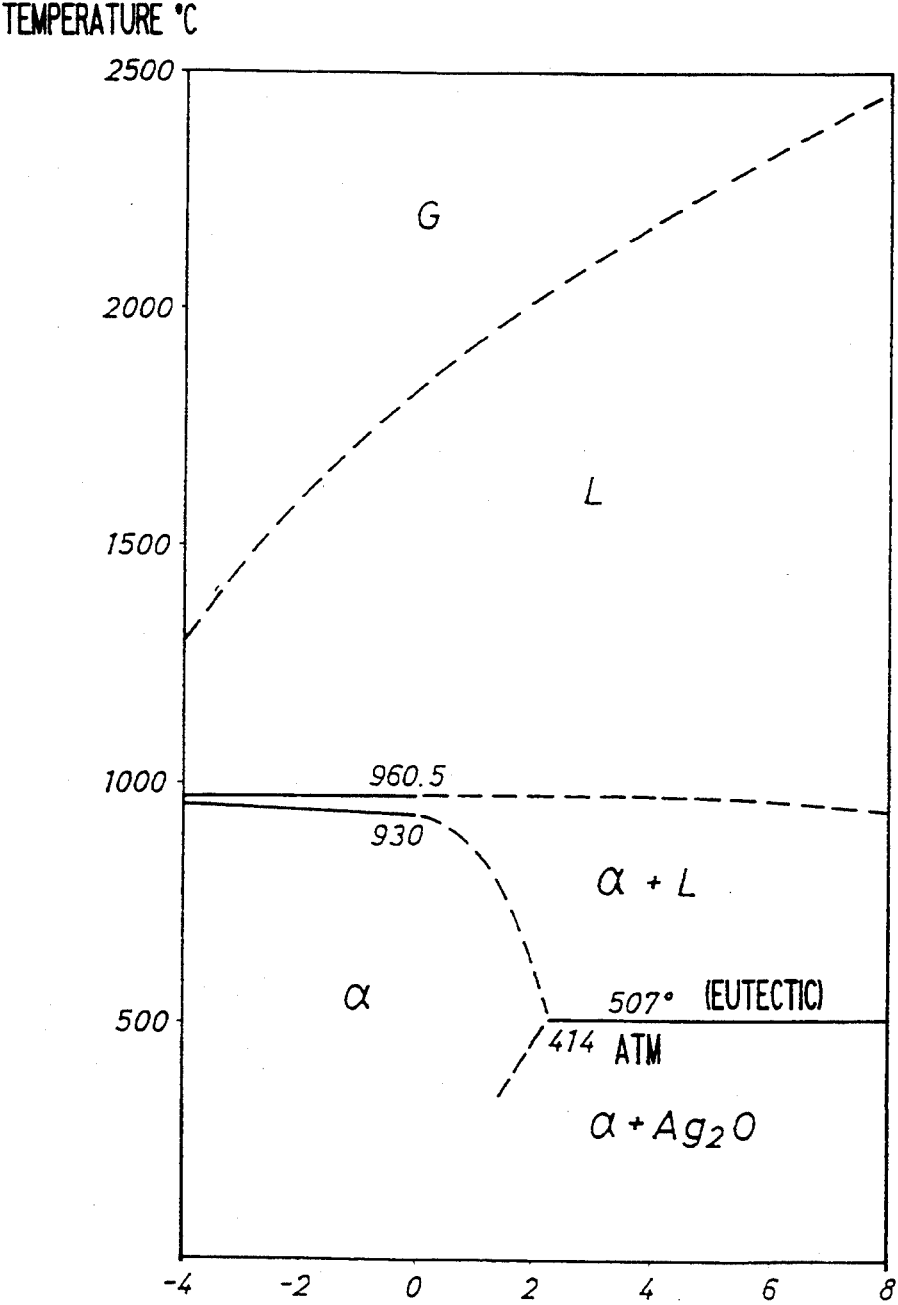
FIG. 1 shows a temperature vs. pressure phase diagram of silver-oxygen system.

Silver or silver-copper alloy is used for the matrix because it meets the requirement of electrode materials for a high electric conductivity. If a ceramic is dispersed in the matrix to enhance refractory properties, it is inevitable for the electric conductivity of a resulting material to be decreased; hence silver or silver-copper alloy is suitable to retain a necessary conductivity. Where a silver-copper alloy is used, the content of copper therein needs to be 50% by weight or less, because a content of copper exceeding 50% by weight makes difficult deoxidation in said step (C).

The oxide of the (a) element has high refractory properties and is effective in improving welding resistance and wear resistance. The content of the (a) element needs to be in a range of 0.5 to 25% by weight. If the content of the (a) element is less than 0.5% by weight, the resulting composite material is poor in refractory properties; if it is more than 25% by weight, the material is poor in toughness because the amount of the matrix is relatively too small.

On the other hand, although the (b) element per se does not have good refractory properties very much, it serves to assist oxidation of the (a) element, and in particular it is effective where the (a) element in a metallic state is contained in a high concentration. The content of the (b) element is in a range of 0.01 to 5% by weight. If the content of the (b) element is less than 0.01% by weight, the effect of assisting oxidation of the (a) element is insufficient; if it is more than 5% by weight, the resulting material is poor in refractory properties.

In the composite material, the oxide of the (a) element and, optionally, the oxide of the (b) element are dispersed in the form of fine particles with a particle size of not more than 0.1 $\mu$m uniformly throughout the matrix from the surface to the core thereof and is bound to the matrix in a good wet state. Further, there is no space left between the oxide particles and the matrix. This dispersion state enables the composite material to form an electrode having good welding resistance and wear resistance. The means by which the dispersion state above can be achieved is the treatment of oxidation under a high pressure conducted at step (A) described below.

FIG. 1 shows a temperature vs. pressure phase diagram of silver-oxygen system. Referring to FIG. 1, a region indicated $\alpha+L$ exists above 507° C. and above 414 atm. The dotted line is assumed because the boundary has not been confirmed. The process of production of the present invention uses the $\alpha+L$ region. Specifically, a mixture with a given composition is heated and brought to the condition in which a liquid phase and a solid phase coexist under a high oxygen partial pressure. Under this condition, $Ag_2O$ forms a liquid phase and therefore goes into spaces, if present, in said mixture to thereby produce a close texture with no space being left; where the (a) element and/or, optionally, the (b) element partly or wholly exist(s) in a metallic state, the elemental metals are oxidized to precipitate as oxides, and the oxygen consumed for the oxidation is supplemented immediately from the outside. The process of formation of close texture, oxidation of the (a) element and optionally the (b) element, and the immediate supplementation of oxygen from the outside, proceeds in succession from the surface of the mixture toward the core thereof, to finally form the composite material in which the oxides of metals are dispersed uniformly therethroughout. In the course of the process, the oxides of the (a) and (b) elements may exchange oxygen therebetween to form compound oxides thereof.

The oxides of elemental metals which precipitate by oxidation under high pressure are in the form of fine particles with a particle size of 0.1 $\mu$m or less. Such a fine particle size brings about uniformity in hardness of the resulting composite material. For this reason, where the (a) element and, optionally, the (b) element are used in a state of oxide as raw materials, the oxides should have a particle size of about 0.1 $\mu$m or less.

The phase diagram mentioned above relates to a system of pure silver and oxygen, and should be altered if an element of (a) and, optionally, (b) are added. The conditions in which liquefication takes place generally shift to a lower temperature and a lower oxygen partial pressure by the addition, and a $\alpha+Ag_2O+L$ region may appear between the $\alpha+L$ region and the $\alpha+Ag_2O$ region. As a matter of fact, any conditions can be selected for conducting step (A) as long as a liquid phase is partly generated. For a particular aimed composition, if temperature and oxygen partial pressure are gradually increased, the system will transfer from a solid state to a state where a solid phase and a liquid phase coexist; hence it is easy for those skilled in the art to find the liquid-solid coexistence state. Practically, step (A) can be suitably carried out at a temperature of 300° to 600° C. and at an oxygen partial pressure of 300 atm or above.

Where the matrix is composed of a silver-copper alloy, the oxidation under a high pressure may be carried out in the same manner as above.

The mixture of silver optionally together with copper, the (a) element and optionally the (b) element to be subjected to oxidation under a high pressure, may take any form out of an alloy, a sintered product and a green compact. The sintered product or green compact may have any composition, and may be covered with silver layer or a silver-copper alloy layer or may be a composite prepared by impregnation with the melt of silver or the alloy. The composite may be further subjected to metallic shielding and then hot forging or drawing. A composite material produced by the present process may be ground and then used again for a part or the whole of the mixture to be treated in step (A).

A composite material thus obtained from the step of oxidation under high pressure is markedly hard, so that it can be plastic-worked with difficulty. Therefore, said mixture is preferably formed into the shape of a desired electrode in advance. Besides, an alloy containing the (a) element in a high concentration has poor plasticity and therefore cannot be readily formed. It is desirable to grind an alloy or a sintered alloy containing the (a) element twice the finally aimed content, to mix the resulting powder with a silver powder or a silver-copper alloy powder so that the content of the (a) element may become the finally aimed value, to compact the mixed powder into a desired shape and to sinter provisionally the green compact in a neutral or reductive atmosphere.

In step (B), after the treatment of oxidation under high pressure, the mixture is cooled and the oxygen partial pressure is decreased, so that $Ag_2O$ formed in step (A) in the matrix will be decomposed at 250° C. or less and converted back into pure silver spontaneously.

Where the matrix is composed of a silver-copper matrix, however, copper tends to remain oxidized after step (B), and the amount of the copper oxide increases with the copper content in the silver-copper alloy; therefore, deoxidation is required in step (C). The deoxidation can be carried out by heating said mixture in vacuum or in a reductive or neutral atmosphere. For the reductive atmosphere, preferred are gases having a weak reductive power so as not to reduce the oxides of the (a) element and the (b) element. Where the content of copper in the matrix is low, step (C) is not always required but is preferably conducted.

EXAMPLES

Preparation of Test Specimens

Specimen No.1 and No.2:

An alloy having the composition given in Table 1 was heated and melted at about 1,000° to 1,200° C. in a high frequency induction furnace, and the melt was poured into a mold made of graphite to give an ingot in the form of a plate with a weight of about 5 kg. The both surfaces with a thickness of about 2 mm of the ingot was peeled, and then a pure silver layer which was 1/10 the peeled ingot in thickness was lapped on one side of the ingot. The ingot was then hot rolled so that the thickness might become 30% of the original thickness. The clad material thus obtained was cold rolled to produce a plate with a thickness of 3 mm, from which a disc with a diameter of 6 mm was stamped out.

Specimen No. 3:

An alloy with the composition given in Table 1 was heated and melted in the same manner as above, and the melt obtained was cast into a hole of 6 mm in diameter and 3 mm in depth, followed by cooling to give a disc. The disc was plated with silver in a thickness of 5 μm.

Specimen No. 4 and No. 5:

An alloy with the composition given in Table 1 was melted in the same manner as above, the melt obtained was centrifugally atomized into nitrogen to form an alloy powder. The powder was ground in a ball mill and then pressed under a pressure of 1 ton/cm². The green compact obtained was provisionally sintered by maintaining it at 750° C. in nitrogen for 1 hour, and thereafter formed into a disc of 6 mm in diameter and 3 mm in thickness.

above size was inserted in and connected in a concave hole with a diameter of 6 mm and a depth of 2 mm provided on the tip of an electrode holder having a cylindrical portion of 16 mm in diameter and 25 mm in length. The top of the disc was worked and ground into a shape of truncated cone with a top surface of 5 mm in diameter, and the disc thus treated was used as an electrode. For welding, Two sheets of galvanized sheet iron were lapped one over the other, and welding of the edge of one to that of the other was attempted by spot welding. The welding operation was conducted by welding currents of 8,000 A and 15,000 A Spot welding was repeated until the electrode became useless due to wear or welding, and the number of spot welding operations conducted was measured. For comparison, a Cr—Cu electrode and a Cu—Al₂O₃ sintered electrode each having the same shape and size as the specimens of the invention above were tested in the same manner as above, provided that Cr—Cu electrode was tested by 8,000 A and the Cu—Al₂O₃ sintered electrode was tested by 15,000 A. The ratio of the repeated welding operation number of each specimen of the present invention to that of the conventional Cr—Cu electrode or Cu—Al₂O₃ sintered electrode was sought. The results are given in Table 1

TABLE 1

| Specimen No. | Composition of alloy | | | Oxidation conditions | | Deoxidation conditions | | Ratio of spot welding operation numbers | |
|---|---|---|---|---|---|---|---|---|---|
| | Matrix* composition | (a) element (wt. %) | (b) element (wt. %) | $O_2$ pressure (kg/cm²) | Temp. (°C.) | Vacuum degree (Torr) | Temp. (°C.) | Relative to Cr—Cu electrode | Relative to $Al_2O_3$—Cu electrode |
| 1 | Ag | Al (6) | — | 450 | 500 | — | — | 2.5 fold | 6.2 fold |
| 2 | Ag | Mg (5) | Ni (0.1) | 450 | 480 | — | — | 4.4 fold | 12.0 fold |
| 3 | Ag | Mg (8) | Sn (0.3) | 500 | 500 | — | — | 12.0 fold | 9.1 fold |
| 4 | Ag—Cu (7 wt %) | Mg (5) | Sn (0.5) | 450 | 480 | $10^{-3}$ | 750 | 5.2 fold | 7.2 fold |
| 5 | Ag—Cu (15 wt %) | Al (7) | Sn (0.3) | 500 | 500 | $10^{-3}$ | 750 | — | 14.3 fold |

*Remarks: Cu content is indicated in parentheses.

Oxidation Treatment

The specimens of Nos. 1 to 5 described above were subjected to oxidation using an apparatus for oxidation under high pressure provided with a pressure vessel made of a heat-resistant stainless steel. A specimen was placed in the vessel. First, the inside of the vessel was replaced with a nitrogen gas, and then a pure oxygen was introduced therein. The temperature and oxygen pressure were raised so that conditions where a liquid phase and a solid phase coexist were reached, and the conditions were maintained for 360 hours. Thereafter, the pressure was reduced and the system was cooled, and subsequently the test specimen was taken out of the vessel. Oxidation conditions employed for each specimen are given in Table 1.

Deoxidation Treatment

The matrixes of specimen No.4 and No. 5 are composed of a silver-copper alloy. After the oxidation treatment, copper remains oxidized, and therefore deoxidation is necessary. The specimens were treated under the conditions as given in Table 1.

Electrode Life Comparing Test

The specimens, discs of 6 mm in diameter and 3 mm in thickness, prepared as described above were subjected to test for electrode life. In each test, a disc of the The results in Table 1 show that the composite material of the present invention has been markedly improved in performance as compared with the conventional Cr—Cu electrodes and Cu—Al₂O₃ sintered electrodes Specimens prepared in the same manner as in specimen Nos. 1 to 5 were cut, and the cut surfaces were observed thought a microscope to find that fine metal oxide particles having a particle size of 0.1 μm or less were dispersed uniformly throughout the matrix with no space left between themselves and the matrix.

I claim:

1. A silver-metal oxide composite material comprising a silver matrix and (a) from 0.5 to 8% by weight, in terms of elemental metal, of an oxide of at least one element from the group consisting of Mg, Al, Zr, Ca, Ce, Be, Th, Sr, Ti, Cr, Hf, and Si, the oxide of the (a) being dispersed in the form of fine particles with a particle size of not more than 0.1 μm uniformly throughout the matrix from the surface to the core thereof and being bound to the matrix with no space left between the oxide and the matrix.

2. A welding electrode comprising the composite material of claim 1.

3. A silver-metal oxide composite material comprising a silver matrix and (a) from 0.5 to 25% by weight, in terms of elemental metal, of an oxide of at least one element selected from the group consisting of Mg, Zr, Ca, Ce, Be, Th, Sr, Ti, Cr, Hf and Si, the oxide of the (a) being dispersed in the form of fine particles with a particle size of not more than 0.1 μm uniformly throughout the matrix from the surface to the core thereof and being bound to the matrix with no space left between the oxide and the matrix.

4. A silver-metal oxide composite material prepared by the process comprising the steps of:

(A) raising the partial pressure of oxygen and heating therein a mixture comprising silver; and (a) from 0.5 to 25% by weight, in terms of elemental metal, of at least one element selected from the group consisting of Mg, Al, Zr, Ca, Ce, Be, Th, Sr, Ti, Cr, Hf and Si, in a metallic and/or oxide state, to thereby bring the mixture into a state where a solid phase and a liquid phase coexist, whereby all of the (a) element in a metallic state is precipitated as oxides, and (B) lowering the partial pressure of oxygen and cooling the mixture thus treated, wherein the oxide of the (a) element is dispersed in the form of fine particles with a particle size of not more than about 0.1 μm uniformly throughout the silver from the surface to the core thereof.

5. A welding electrode comprising the composite material of claim 3.

6. A welding electrode comprising the composite material of claim 4.

* * * * *